Aug. 6, 1968  C. W. SCOVILLE  3,395,918
STORAGE DEVICE AND OPERATING MECHANISM FOR A TARPAULIN
FOR THE PROTECTION OF A PLAYING FIELD
Filed Oct. 26, 1965  3 Sheets-Sheet 1
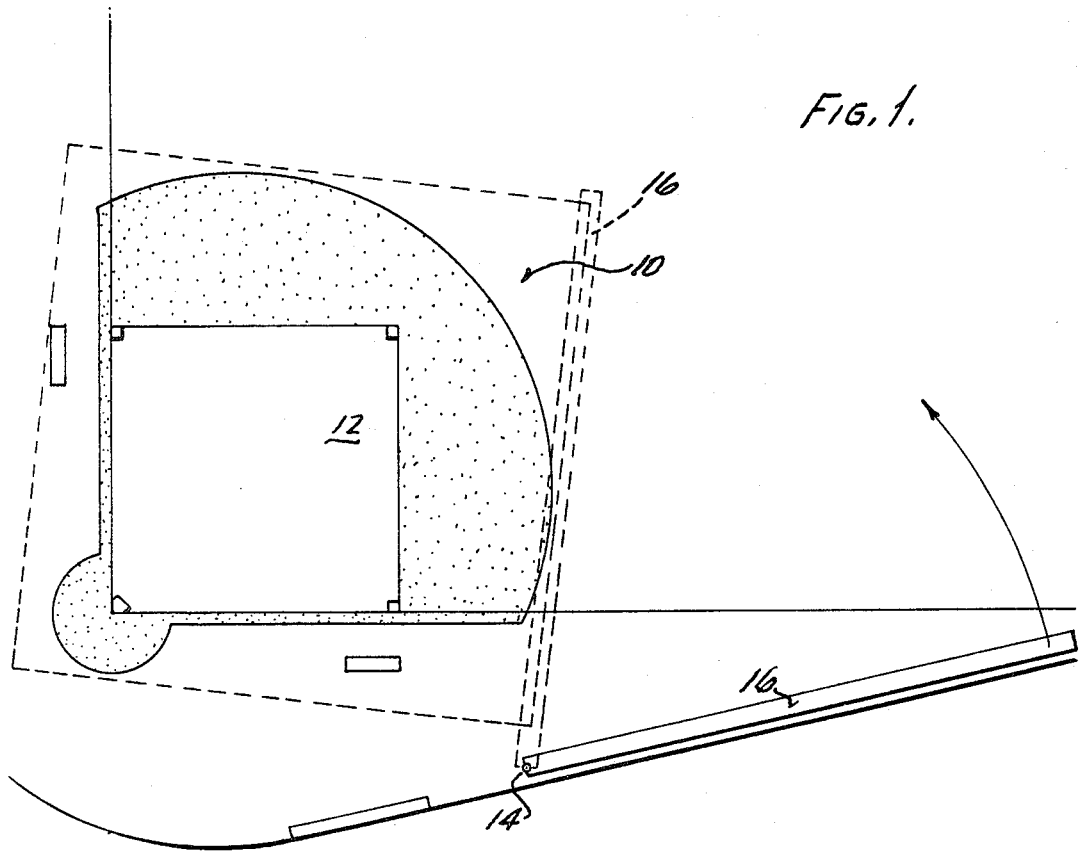
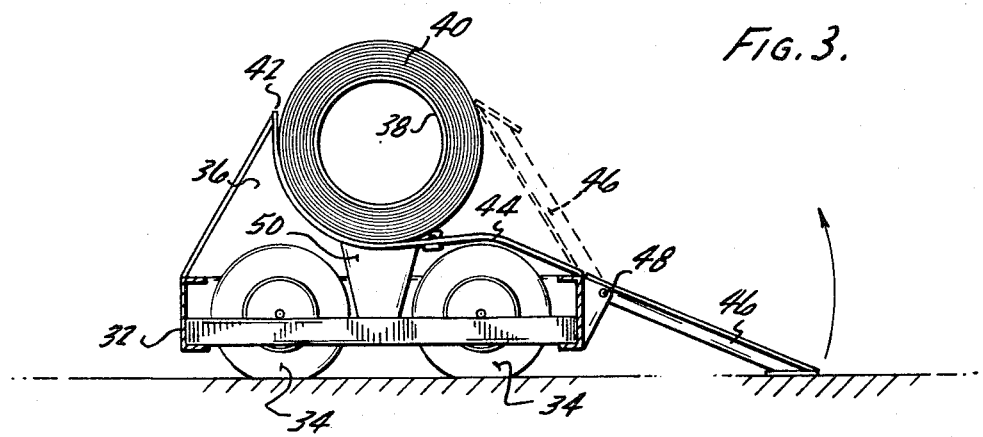
INVENTOR.
CLYDE W. SCOVILLE
BY
Wheeler, Wheeler & Wheeler
ATTORNEYS.

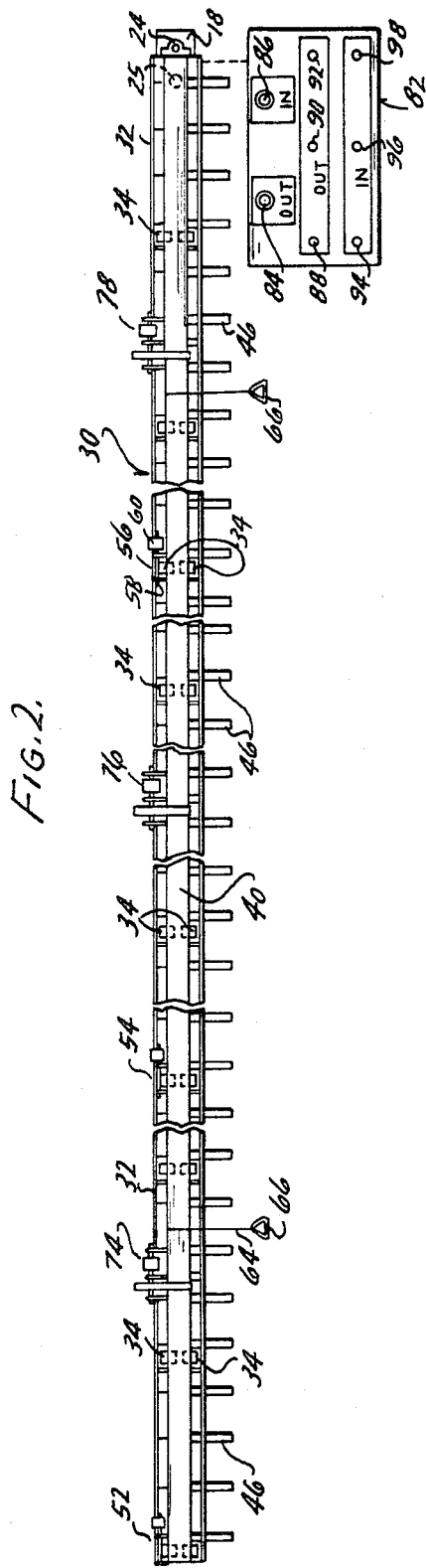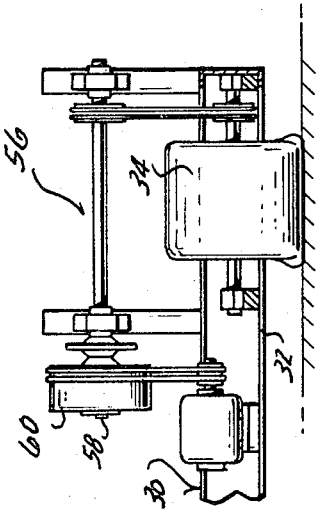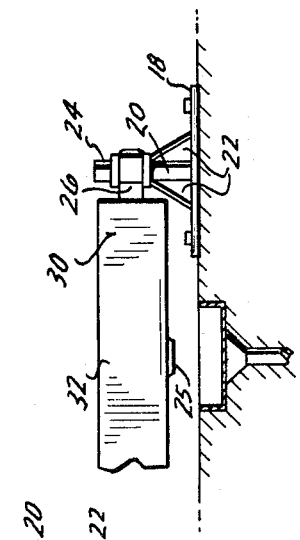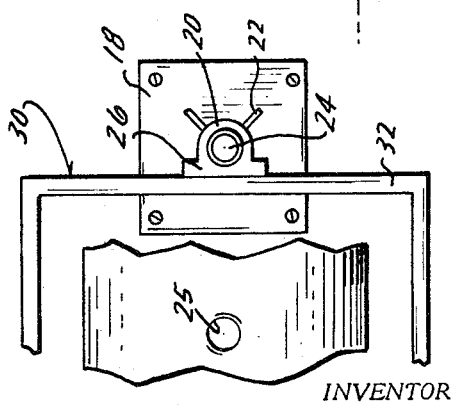

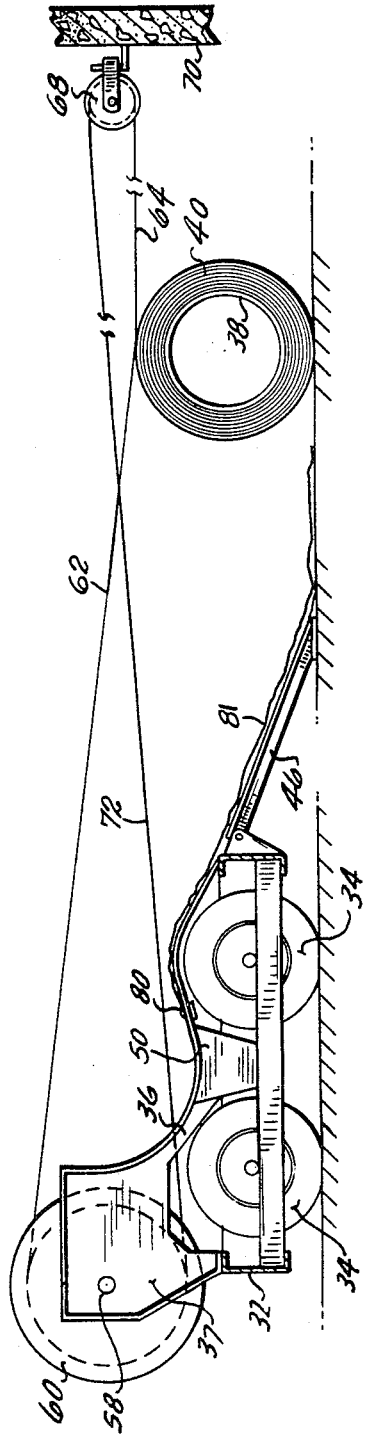

3,395,918
STORAGE DEVICE AND OPERATING MECHANISM FOR A TARPAULIN FOR THE PROTECTION OF A PLAYING FIELD
Clyde W. Scoville, Rte. 1, Box 73A, Waukesha, Wis. 53186
Filed Oct. 26, 1965, Ser. No. 505,292
7 Claims. (Cl. 273—27)

ABSTRACT OF THE DISCLOSURE

A protective tarpaulin large enough to be unrolled to cover a playing field is wound on a reel which is detachably mounted on an elongated and wheeled storage carrier, the carrier being pivoted to the earth at one side of the field to be protected. Ramps guide the tarpaulin reel in rolling from or onto the carrier under tension of power operated tapes. The tapes comprise one set which is wound upon the reel with the cover rolling said reel across a field and unrolling said cover, and one set having bight portions extending around and engaging the reel to wind the cover thereon, and to return the reel to the carrier.

---

This invention relates to a storage device and operating mechanism for a tarpaulin for the protection of a playing field.

The invention is not limited to the protection of a baseball diamond but will be described with particular reference to a device for that purpose.

An elongated storage carrier (of a length at least equal to the width of the field to be protected) has powered supporting wheels for moving it pivotally about a fulcrum point at one of its ends, the object being to carry a tarpaulin reel from a transport and storage position to a position in which the tarpaulin is to be unwound from the reel for protective use. When the carrier stops at a position of use, the tarpaulin is either unwound manually or by power and pulled across the playing field, in this instance, a baseball diamond. Ramps are provided upon which the tarpaulin reel rolls from the carrier to the ground. The reel spreads the tarpaulin as it rolls across the surface of the field. Test demonstrations show that a baseball diamond can be covered within a period of sixty-seven seconds with the instant embodiment.

When it is desired to expose the diamond for use, the reel is rolled by power toward the carrier, rewinding the tarpaulin upon itself as it rolls. Upon reaching the carrier, the reel rolls up the ramps into transport position on the carrier. The carrier has a water-collecting trough into which the tarpaulin automatically delivers any water which has accumulated on its surface. This trough has a pitch toward the carrier fulcrum so that during the reeling operation and the transport operation back to storage position, the water will be draining toward the fulcrum and there delivered into an appropriate sump or drain.

Motors at spaced points along the carrier are preferably provided to control the unreeling and the reeling. These are separate from the motors which drive the carrier wheels in the swinging movement thereof about the fulcrum. In practice, the experimental equipment employs three motors for reeling and they are individually controlled. A motor intermediate the ends of the carrier is principally relied upon. The other two motors near the ends are started and stopped by the operator as required so the tarpaulin will wind uniformly on the reel.

In the drawings:

FIG. 1 is a plan view diagrammatically showing a playing field and illustrating the carrier in full lines in a storage position and in broken lines in an operating position.

FIG. 2 is a plan view of the carrier.

FIG. 3 is a view taken in cross section on the line 3—3 of FIG. 2.

FIG. 4 is a view taken in cross section on the line 4—4 of FIG. 2.

FIG. 5 is a view similar to FIG. 4 showing the tarpaulin reel in process of being returned rather than advanced.

FIG. 6 is a plan view of the fulcrum fixture about which the carrier is oscillatable.

FIG. 7 is a view of the fulcrum fixture in side elevation.

FIG. 8 is a view taken in section on the line 8—8 of FIG. 5.

In FIG. 1 the playing field may be regarded as that area 10 which is enclosed by a broken line and which includes the baseball diamond 12.

At a point 14 at one corner of the area 10, there is pivoted the end of an elongated carrier 16. The fulcruming means and the carrier are shown in detail in other views. It is possible to locate the fulcrum elsewhere, and to provide for a range of angular movement which will differ from the disclosure in FIG. 1, according to the area which is to be protected.

The fulcruming device is simple, comprising merely a flat plate 18 resting on the ground and which supports a tubular bearing 20 braced by gussets 22. Pivoted within the bearing member 20 is a stud 24 depending from an arm 26 at the end of an elongated carrier 30. This carrier has a frame 32 supported on wheels 34, at least some of which are power driven as hereinafter explained. At intervals along the carrier there are saddle-forming plates 36 which support for transportation and storage a tube 38 which is about as long as the carrier 30 and which serves as a reel upon which the tarpaulin 40 is wound (FIG. 3). Each saddle is high at one side, at 42, to provide a positive stop against which the reeled tarpaulin will engage when it is rolled onto the carrier. At the other side, the saddle plates 36 are nearly horizontal at 44 to provide surfaces leading to the folding ramp arms 46. These are normally in the elevated position shown in dotted lines in FIG. 3 but are pivotally connected at 48 with the frame 32 so that the ramps can be lowered to facilitate rolling the reel and tarpaulin from the carrier and remounting it thereon for transportation or storage.

Carried by the frame and extending through the saddle plates 36 for substantially the whole length of the carrier is a trough 50, the bottom of which has a pitch toward the pivoted end of the carrier and serves to deliver into the drain 25 water which is on the tarpaulin as the latter is rewound by the reel rolling over the surface of the playing field and approaching its transport and storage position on the carrier.

At spaced intervals along the length of the carrier, there are driving motors connected to the supporting and propelling wheels. One such motor is shown at 52 at the free end of the carrier. Another motor is shown at 54 and a third at 56.

As best shown in FIGS. 4 and 5, certain of the saddle plates 36 are provided with upward extensions at 37 to support winch shafts 58 upon which are the power-driven winch drums 60 for return tapes 62 having bights extended by the tarpaulin reel as it rolls outwardly. Wound with the tarpaulin on reel 38 are pull-out tapes 64 which may either be provided with handles as at 66 (FIG. 5) or may extend about pulleys 68 detachably connected with a wall 70 and returned at 72 to the winch drum 60 as shown in FIG. 4. The winches may be disposed at various points along the length of the carrier 30 as for example at 74 near its outer end and at 76 and 78.

At one margin 80, either tarpaulin 40 or a protective canvas 81 is connected to the carrier. When the carrier is swung to the position shown in dotted lines in FIG. 1, and the several ramps 46 are lowered, the tapes are pulled out either manually or by power to cause the tarpaulin reel 38 to roll down the ramps (unrolling the protective canvas 81 as it goes) and onto the playing field and across the playing field spreading the tarpaulin until the reel reaches the far side of the field and the tarpaulin is spread across the field. Preferably, a heavier and more wear resistant canvas 81 rather than tarpaulin 40 is connected to the anchorage 80 and covers ramps 46. The tarpaulin is thereupon free of the carriage to permit subsequent unrolling and drying.

I provide a control panel 82 which may be located anywhere. Conveniently, I may place it either on the carrier or near the pivot pin 24 about which the carrier oscillates. This panel contains push button switches diagrammatically shown at 84 and 86 which are connected in known manner to the drive motors 52, 54 and 56. In actual practice, it is found that these motors may be operated at the same speed. The respective speed reducers vary in ratio, being respectively 4.77 to 1; 9.14 to 1; and 17.88 to 1. Any slight difference in arc of travel of the driven wheels 34 may then be compensated simply by varying the degree of inflation by a pound or two of air pressure.

The winch drums 60 driven by the several reversible motors 74, 76, 78 have one set of push buttons 88, 90, 92 which control the operation of the winch drums in a direction to exert tension on the several pull-out tapes 72 which advance the reel 38 off of the carrier and across the playing field to lay the tarpaulin on the field. The operator can regulate any inequalities in the rate of unrolling of the tarpaulin by his manipulation of the switches 88, 90 and 92, temporarily relieving the finger pressure on the push button controlling one of these normally open switches if the winch motor controlled by that switch is operating too rapidly, thereby tending to produce an unduly fast movement of the reel in that point intermediate its width.

Similarly, another set of normally open switches may be controlled by the push buttons 94, 96 and 98 to operate the drums 60 in a direction to reel in the return tapes 62. The bights extended during the spreading of the tarpaulin are now tensioned to pull, and thereby to rotate the reel in a direction to cause it to move over the playing area toward the carrier, rewinding the tarpaulin as it advances.

When the reel reaches the carrier, the tapes will cause it to roll up the ramps 46 to the saddle provided on the carrier by the several saddle plates 36. As already explained, the rewinding of the tarpaulin on the reel will cause any water on the surface of the tarpaulin to be advanced ahead of the reel and such water will be discharged into the trough 50 on the carrier to flow by gravity to the drain 25.

The power operated tapes may be used for rolling and unrolling the reel to spread and rewind the tarpaulin whether the reel is stored in a pit or on a pivoted carrier.

I claim:

1. Means for protecting a playing field and comprising a reel upon which a playing field cover is rolled, an elongated carrier for the reel having means fulcruming only one end of the carrier for pivotal movement about an upright axis at one side of the field between retracted and advanced positions, means for moving the carrier to its advanced position, means for rolling the reel off of the carrier onto the field requiring protection and across such field, thereby unrolling the cover and laying it on the field, and means for rolling the reel back toward the carrier, thereby winding the cover upon it, and for restoring the reel and cover to the carrier for storage and transportation thereon pivotally to the retracted position of the carrier.

2. Playing field protecting means according to claim 1 in which the cover has a margin fastened to the carrier and the carrier has a drainage channel extending longitudinally thereof toward the fulcruming means and adapted to receive water discharged from the cover over said margin as the reel rewinds the cover and returns to the carrier.

3. A playing field cover according to claim 1 in which the carrier has supporting wheels upon which it moves pivotally about its fulcrum, and means for the power operation of said wheels.

4. A playing field cover according to claim 1 in which tapes are wound with the cover upon the reel and the carrier is provided with windlasses upon which the tapes are also wound and which have means for power operation to tension certain of said tapes for causing the reel to roll across the playing field in a direction to unwind the cover and to tension others of said tapes for causing the reel to roll across the field in a direction to wind the cover upon itself and to move toward said carrier.

5. A playing field cover according to claim 4 in which the several windlasses have separate motors and the separate motors have separate switches for manual operation to determine the rate at which the respective windlasses tension said tapes, whereby an operator manipulating the switches can keep all portions of the reel in motion at substantially the same rate.

6. A field-protecting cover according to claim 1 in which the carrier is provided at intervals along its length with saddles upon which the reel and cover wound thereon are held for storage and transportation on the carrier, the carrier being provided at intervals throughout its length with ramp means for lowering the reel and cover from the saddles to the playing field in one direction of rotation of the reel and for elevating the reel and cover from the playing field to the saddles in the opposite direction of rotation of the reel.

7. Means for protecting a playing field and comprising a reel upon which a playing field cover is wound, a plurality of tapes wound on such reel with the cover and constituting means for rolling the reel across the playing field to spread the cover thereover, and a plurality of tape means having bight portions engaging said reel for rolling the reel in an opposite direction across the playing field to rewind the cover upon the reel, in further combination with power operated winches, each winch being connected to a respective one of said tape means, and means for controlling independently the operation of the respective winches.

References Cited

UNITED STATES PATENTS 3,108,804  10/1963  Wagner _____ 273—27

ANTON O. OECHSLE, *Primary Examiner.*

P. SHAPIRO, *Assistant Examiner.*